United States Patent [19]
Jung et al.

[11] Patent Number: 5,142,379
[45] Date of Patent: * Aug. 25, 1992

[54] POWER FEEDING AND INPUT SIGNAL SWITCHING CONTROL SYSTEM FOR VIDEO TAPE RECORDER COMBINED WITH TELEVISION RECEIVER AND CAMERA IN A BODY

[75] Inventors: Se-Young Jung; Tea-Weon Moon, both of Suweon City, Rep. of Korea

[73] Assignee: SamSung Electronics Co., Ltd., Suweon City, Rep. of Korea

[*] Notice: The portion of the term of this patent subsequent to Aug. 29, 2006 has been disclaimed.

[21] Appl. No.: 729,857

[22] Filed: Jul. 11, 1991

Related U.S. Application Data

[63] Continuation of Ser. No. 398,918, Aug. 28, 1989, Pat. No. 4,862,290, which is a continuation of Ser. No. 87,868, Aug. 21, 1987, abandoned.

[30] Foreign Application Priority Data

Aug. 22, 1986 [KR] Rep. of Korea .................. 6936/1986

[51] Int. Cl.⁵ ............................................. H04N 5/44
[52] U.S. Cl. .................................. 358/335; 358/188; 358/190
[58] Field of Search ...................... 358/335, 190, 191.1, 358/181, 188, 906

[56] References Cited

U.S. PATENT DOCUMENTS

| | | | |
|---|---|---|---|
| 3,484,548 | 12/1969 | Kowal et al. | 358/188 |
| 4,337,480 | 6/1982 | Bourassin et al. | 358/188 |
| 4,740,828 | 4/1988 | Kinoshita | 358/906 |
| 4,862,290 | 8/1989 | Jung et al. | 358/335 |

FOREIGN PATENT DOCUMENTS 0015797 9/1980 European Pat. Off. ............ 358/188
52-88009 7/1977 Japan .

Primary Examiner—L. T. Hix
Assistant Examiner—David M. Gray
Attorney, Agent, or Firm—Robert E. Bushnell

[57] ABSTRACT

A power feeding and input signal switching control system for use in conjunction with a video tape recording and reproducing apparatus which includes a video tape recorder, a television receiver and a camera combined together in a body. Each power source for operating each device in the apparatus is selectively fed to only devices to be operated in response to a switching action in a controller and simultaneously an input source of video and audio signals to the video tape recorder is selectively switched by the same switching action in the controller.

17 Claims, 2 Drawing Sheets

POWER FEEDING AND INPUT SIGNAL SWITCHING CONTROL SYSTEM FOR VIDEO TAPE RECORDER COMBINED WITH TELEVISION RECEIVER AND CAMERA IN A BODY

This is a continuation of application Ser. No. 07/398,918 filed on Aug. 28, 1989 now U.S. Pat. No. 4,862,290, which was a divisional application of U.S. Ser. No. 07/087,868 filed Aug. 21, 1987, now abandoned.

BACKGROUND OF THE INVENTION

2. Field of the Invention

This invention relates to power feeding and input signal switching controls for video tape recorders, and particularly to a control system which selectively controls power feeding and input signal switching according to each function to be selected in a video tape recording and reproducing system having a video tape recorder, a television receiver, and a camera in a single body.

2. General Description of the Prior Art

A video tape recorder is an apparatus to record video and audio signals in a cassette tape and thereby reproduce the video and audio signals as required, and is certainly one of the most commonly used electronic audio/visual devices nowadays. In general, a camera may be used as one of the input devices for any video signals, while a monitor device or a television receiver have been widely used for playing original video and/or audio signals reproduced out of the video tape recorder. In such a conventional configuration as mentioned just above, it is inevitable to independently employ a monitor device or a television receiver, as well as a camera set, together with the video tape recorder in order to reproduce the original video and audio signals out of the video cassette tape, wherein each electric power source voltage to each device in the system is separately fed and its control to select an input signal of all the video and/or audio sources is not performed in one step of operation, which has been inconvenient for users. In consideration of such problems as stated above, the video tape recorder consequently has been developed, which is combined into a body with a television receiver and a camera. Nonetheless, controls for power source and input signal switching fundamentally do not operate in one step of manipulation. Moreover, a relatively large power consumption has resulted from the large size of the all-combined system. As a result, these almost have become a considerable obstacle in compacting the system into the smaller size, and furthermore have not given enough satisfaction to the users in the viewpoint of its functions.

OBJECT OF THE INVENTION

It is therefore the object of this invention to provide a control system which enables a user to simultaneously and effectively control both electric power feeding and input signal switching in response to the function to be selected in a video tape recording and reproducing apparatus equipped with a television receiver and a camera in one body.

It is another object of this invention to provide a power control system which enables a decrease in dissipation of power by only feeding electric power source to each device in connection with the function to be selected in the video tape recording and reproducing apparatus.

SUMMARY OF THE INVENTION

The objects of the present invention are achieved with a control system for power feeding and input signal switching.

The control system comprises: a control for selectively switching on/off each operation of said video tape recorder, said television receiver and said camera and providing a plurality of main power sources; power feeding means adapted to be coupled to the control for supplying each operating power source voltage to said video tape recorder, said television receiver and/or said camera from the main power sources selectively provided by said control; and signal selector responsive to the switching of said control for selecting the input source of video and audio signals to said video tape recorder.

The novel features which are believed to be characteristic of the invention, together with further objectives and advantages thereof, will be better understood from the following description considered in conjunction with the accompanying drawings. The drawings illustrate a presently preferred embodiment of the invention by way of example. It is to be expressively understood, however, that the drawings are for the purposes of illustration and description only and are not intended as a definition of the limits of the invention.

Like numbers in both figures refer to like elements.

DETAILED DESCRIPTION OF THE PREFERRED EMBODIMENT

Figure 1:
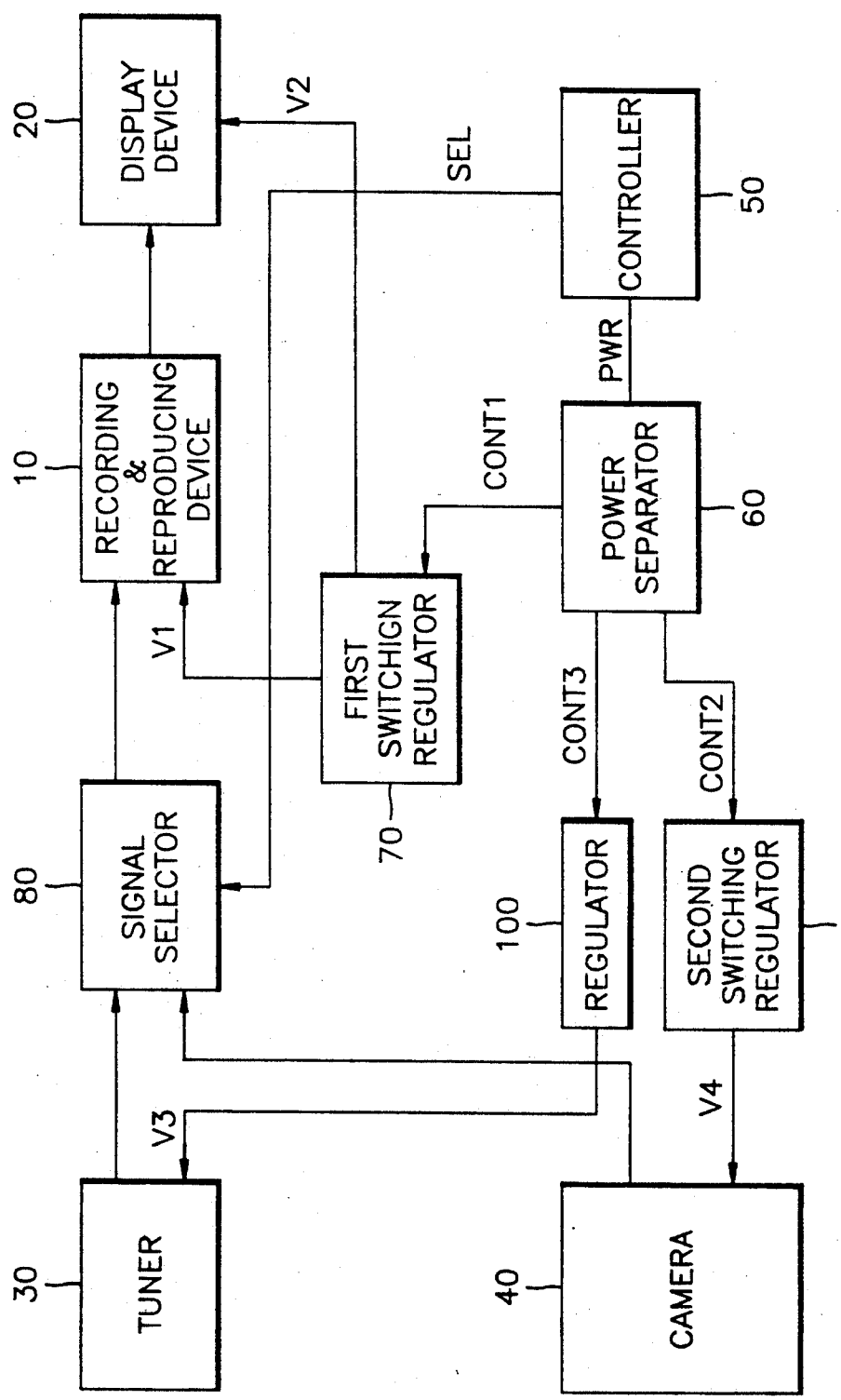
FIG. 1 is a block diagram of the preferred embodiment of the invention.

FIG. 1 is a block diagram of the preferred embodiment of the power feeding and input signal switching control system in accordance with the present invention, in which there are included a video tape recording and reproducing device 10 (conventionally referred to as "VTR") adapted to be fed by a power source voltage V1 for respectively recording and reproducing both audio and video signals, a display device 20 coupled to the recording and reproducing device 10 and adapted to be fed by a power source voltage V2 for displaying the video signals on a screen, a tuner 30 adapted to be fed by a power source voltage V3 for receiving television broadcasting signals in a selected channel, a camera 40 adapted to be fed by a power source voltage V4 for generating the video and audio signals out of the object selected and supplying the signals to the recording and reproducing device 10, a controller 50 for respectively providing a set of source voltages PWR and another set of selection control signals SEL in response to a selective switching for each function, a power separator 60 coupled to the controller 50 for selectively providing power control signals CONT1, CONT2 and/or CONT3 in response to the source voltage PWR selected, a first switching regulator 70 connected to the power separator 60 for feeding to both the recording and reproducing device 10 and the display device 20 each operating source voltage V1 and V2 by the power control signal CONT1, a second switching regulator 90 connected to the power separator 60 for feeding to the camera 40 an operating source voltage V4 by the power control signal CONT2, a regulator 100 connected to the power separator 60 for feeding to the tuner 30 an operating source voltage V3 by the power control signal CONT3, and a signal selector 80 coupled to the controller 50 to enable to selection as a signal input source for the recording and reproducing device 10 either the tuner 30, the camera 40 or an exterior auxiliary input jack 33, 34 in response to the selection control signal SEL.

A switch 50 in the controller 50 makes up both the control signal SEL and the source voltage PWR at the same time, which are used to get each device to be selected as requested and its operating source voltage to be effectively fed in the combined video tape recording and reproducing apparatus. The source voltage PWR from the controller 50 contributes to produce the power control signals CONT1, CONT2 and/or CONT3, which respectively control the actual operations of the first switching regulator 70, the second switching regulator 90 and the regulator 100. By these controls, the regulators 70, 100 and 90 succeed to feed to the recording and reproducing device 10, the display device 20, the tuner 30 and the camera 40 V3 each operating power source voltage V1, V2, V3 and VA. The selection control signal SEL is fed to the signal selector 80, by which the actual input signal to be applied to the recording and reproducing device 10 is selected out of a plurality of input sources such as a tuner, a camera, an exterior auxiliary input jack, etc. In the same time that one input signal source is selected to be operated, the recording and reproducing device 10 records and reproduces the input video and audio signals into/from the tape, so that the original signals may be played on the display device 20, or through any other means.

Figure 2:
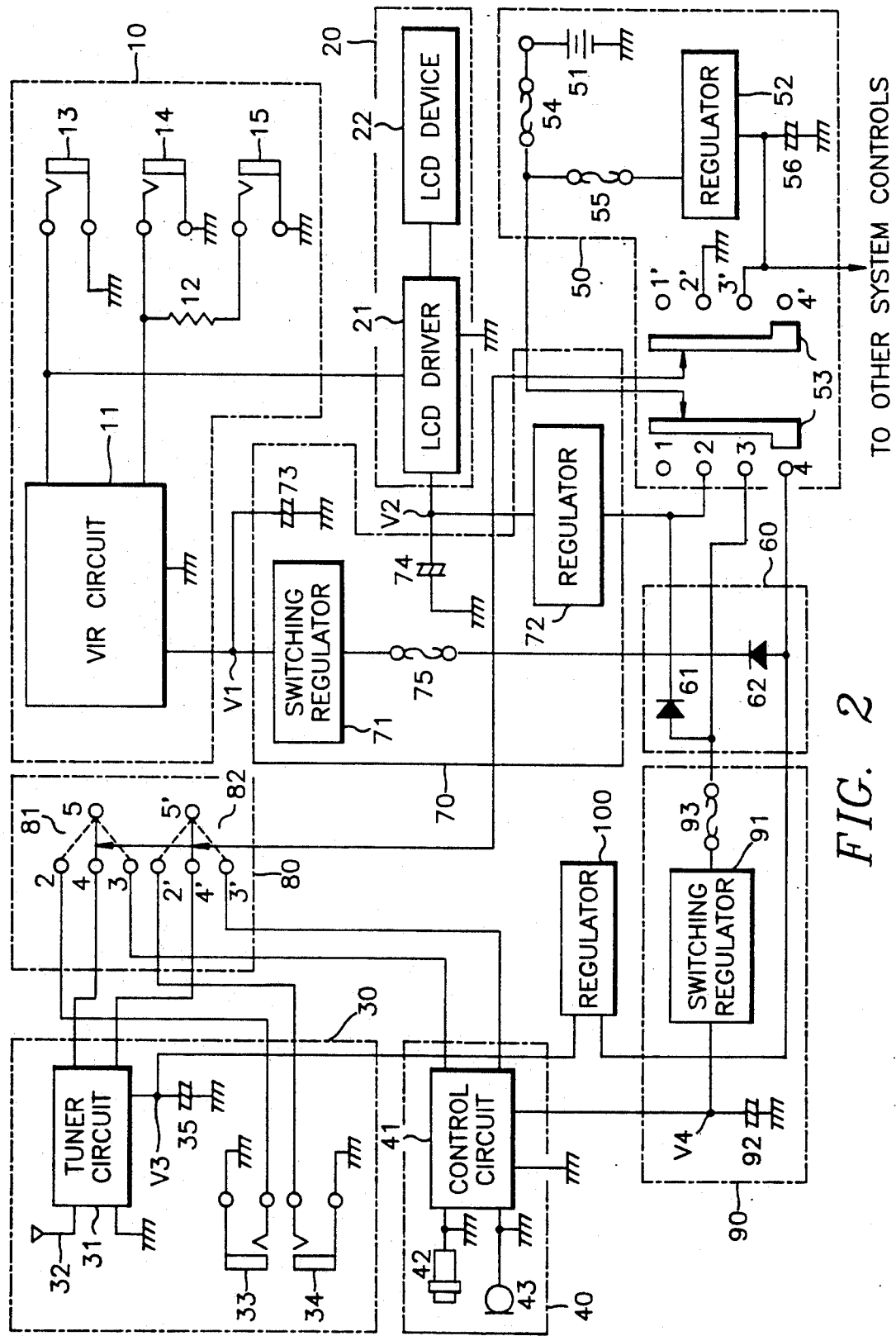
FIG. 2 is an electrical schematic diagram of the preferred embodiment of the invention.

FIG. 2 shows a electrical schematic diagram of the preferred embodiment of FIG. 1 in accordance with the present invention. In connection with FIG. 1, the recording and reproducing device 10 consists of a conventional VTR circuit 11, a resistor 12, a line video-out jack 13, a line audio-out jack 14 and an earphone jack 15. The display device 20 includes a liquid crystal display (LCD) device 22 and LCD driver 21 thereof which is connected to the VTR circuit 11. The tuner 30 includes a conventional tuner circuit 31 for receiving the television broadcasting signals, an antenna device 32, a line video-in jack 33, a line audio-in jack 34 and a capacitor 35. The camera 40 includes a microphone 43, a vidicon 42 and a control circuit 41 thereof. The controller 50 includes a battery 51, a regulator 52, a coupling switch 53, fuses 54 and 55, and a capacitor 56, the coupling switch 53 has four selective pairs of terminals 101', 202', 303' and 404' which are operated in each pair. The power separator has a diode 61 of which cathode is coupled to the terminal 2 of the switch 53 and anode is coupled to the terminal 3 of the switch 53, and another diode 62 of which cathode is coupled to the terminal 2 of the switch 53 and anode is coupled to the terminal 4 of the switch 53. The first switching regulator 70 includes a switching regulator 71, a regulator 72, capacitors 73, 74 and a fuse 75, the switching regulator 71 is coupled to the terminal 2 via the fuse 75 and the regulator 72 directly coupled to the same terminal 2. The signal selector 80 includes a video select switch 81 and an audio select switch 82, both of which are operated in connection with the coupling switch 53 in the controller 50. The terminals 2, 3 and 4 of the video select switch 81 are coupled to each video input or output port of the tuner circuit 31, the camera control circuit 41 or the line video-input jack 33, and in the same manner the terminals 2', 3' and 4' are coupled to each audio input or output port of the same. The terminals 5 and 5' are respectively coupled to the video and audio inputs of the VTR circuit 11. The second switching regulator 90 includes a switching regulator 91, a capacitor 92 and a fuse 93, the switching regulator 91 is connected via the fuse 93 to the terminal 3 of the switch 53. Here, all capacitors 35, 56, 73, 74 and 92 are used to clear the unnecessary surge voltages in the control system.

Now, the operation of the preferred embodiment of FIG. 2 will be described hereinafter in detail.

When the switch 53 is set into the terminal 1-1', all the power sources to the control system are turned off. But, once the switch 53 is set into the terminal 202', the source voltage from the battery 51 is fed to the terminal 2 and at the same time to the regulator 72 and, via the fuse 75, the switching regulator 71. Because the terminal 2' of the switch 53 is turned to the ground level, the switches 81 and 82 which are operated in connection with the operation of the switch 53 are both set into the terminals 2-2', and by these switch settings both the line video-in jack 33 and the line audio-in jack 34 are coupled to the VTR circuit 11 via the switches 81 and 82. The switching regulator 71 feeds a constant DC voltage V1 to the VTR circuit 11 and the regulator 72 feeds another constant DC voltage V2 to the LCD driver 21. Consequently, the VTR circuit 11 is operated to record the video and audio signals received via the video-in jack 33 and the audio-in jack 34 from the exterior system or reproduce any received video signals via the LCD driver 21 on the LCD device 22. Also, it enables transfer of the video and audio signals to any other exterior devices via the line video-out jack 13, the line audio-out jack 14 or the earphone jack 15.

In case that the switch 53 is set into terminals 303', the source voltage from battery 51 is fed to its terminal 3, and at the same time, fed to the switching regulator 91 through the fuse 93 and to the switching regulator 71 and the regulator 72 through the forward-biased diode 61. To the terminal 3' of the switch 53 is fed a DC high voltage of a constant value from the regulator 52. This high voltage drives the select switches 81 and 82 to the terminals 303' which is respectively coupled to the video and audio output ports of the camera control circuit 41. Therefore, a constant CD voltage V4 is fed to the camera control circuit 41, and also the DC voltages V1 and V2 are simultaneously fed to the VTR circuit 11 and the LCD driver 21. Owing to these power connections, the video and audio signals generated in the vidicon 42 and the mike 43 are applied via the select switches 81 and 82 to the VTR circuit 11 to subsequently be recorded in the tape or reproduced on the LCD device 22.

In the meanwhile, when the switch 53 is set into terminals 404', the source voltage from the battery 51 is fed to its terminal 4, and simultaneously fed to the regulator 100 and both the switching regulator 71 and the regulator 72 via the forward-biased diode 62. At this time, the terminal 4' of the switch 53 is set to an open-circuited state, which drives the select switches 81 and 82 to the terminals 404' respectively coupled to the video and audio output ports of the tuner circuit 31. Therefore, another constant DC voltage V3 is fed to the tuner circuit 31, as well as the DC source voltages V1 and V2. By these power connections and input signal driving, the video and audio signals of the tuner circuit 31 generated from the television broadcasting signals received by the antenna 32 in a selected channel are respectively supplied to the VTR circuit 11 via the select switches 81 and 82 to subsequently be recorded in the tape or reproduced on the LCD device 22 and/or in any other output devices.

As described above, there will be achieved an efficient and easy control both in power feeding to each device and selecting of the signal input devices for the VTR system combined with the television receiver and the camera in a body because the manipulation of switching could be done in one stroke of operation. Furthermore, it will be possible to considerably reduce the useless power consumption in the VTR system because each power source voltage is fed to only the devices which are in operation.

What is claimed is:

1. A power feeding and input signal switching control system, comprising:
   control means for selectively switching on/off operation of a video tape recorder, television tuner circuit and video camera, and for providing power and selection control signals;
   power feeding means coupled to the control means, for selectively supplying power during a first operational mode of a plurality of operational modes, to the video tape recorder while interrupting said supplying of power by said power feeding means to the television tuner circuit and the camera during said first operational mode, and during a second operational mode selectively supplying power to the television tuner circuit while interrupting said supplying of power by said power feeding means to the camera; and
   signal selecting means, for responding to said selection control signals by selecting during said second one of said operational modes, the television tuner circuit as an input source of video signals to the video tape recorder, and for responding to said selection control signals by selecting during a third one of said operational modes, the camera as the input source of video signals to the video tape recorder.

2. A control system of claim 1 wherein said control means comprises:
   a switch having a plurality of pairs of terminals operated in pairs, said switch having both a first array of terminals for said supplying of power and a second array of terminals for providing said selection control signals;
   a battery lead selectively coupled to each terminal said first array of terminals of said switch;
   a regulator connected between said battery and a terminal of said switch; and
   a capacitor connected between said terminal of said switch and a ground source.

3. A control system of claim 1 wherein said signal selecting means comprises:
   a video select switch for selecting an input source of video signals for the video tape recorder, and
   an audio select switch for selecting said input source of audio signals for the video tape recorder,
   said video select switch having:
   a first input terminal coupled to a line video-in jack,
   a second input terminal coupled to a video output terminal of the camera,
   a third input terminal coupled to a video output terminal of a tuner of the television tuner circuit, and
   an output terminal coupled to a video input of the video tape recorder, said audio select switch having:
   a first input terminal coupled to a line audio-in jack,
   a second input terminal coupled to an audio output terminal of the camera,
   a third input terminal coupled to an audio output terminal of the tuner circuit, and
   an output terminal coupled to an audio input of said video tape recorder,
   said input terminals of said select switches respectively being selected in a pair of video and audio signals in response to said selection control signals.

4. A power feeding and input switching control system, comprising:
   control means for enabling a plurality of modes of operability of a recorder, a tuner circuit and a camera, by controlling distribution of electrical power and selection control signals for said modes, with both the electrical power and selection control signals being provided during a plurality of said modes;
   means controlled by said control means, for distributing the electrical power to the recorder exclusive of the tuner circuit and the camera during a first of said modes, to the recorder and camera exclusive of the tuner circuit during a second of said modes, and to the recorder and tuner circuit exclusive of the camera during a third of said modes; and
   signal selecting means for responding to said selection control signals by connecting the recorder to receive external sources of video and audio signals during said first mode, connecting the recorder to receive video and audio signals from the camera during said second mode, and connecting the recorder to receive video and audio signals from the tuner circuit during said third mode.

5. A power feeding and input switching control system, comprising:
   control means for enabling a plurality of modes of operability of a recorder, a tuner circuit and a camera, for controlling distribution of electrical power and selection control signals for said modes, with both the electrical power and selection control signals being provided during a plurality of said modes;
   means controlled by said control means, for distributing the electrical power to the recorder exclusive of the tuner circuit and the camera during a first of said modes, to the recorder and camera during a second of said modes, and to the recorder and tuner circuit exclusive of the camera during a third of said modes; and
   signal selecting means for responding to said selection control signals by connecting the recorder to receive external sources of video and audio signals during said first mode, connecting the recorder to receive video and audio signals from the camera during said second mode, and connecting the recorder to receive video and audio signals from the tuner circuit during said third mode.

6. A switching control system, comprising:
   control means enabling a plurality of modes of operability for a recorder, a camera and a broadcast signal receiver, for providing main power and selection control signals for said modes, with both said main power signals and selection control signals being simultaneously provided during a plurality of said modes;

power feeding means controlled by said control means, for connecting said main power to the recorder while interrupting a flow of said main power signals to the receiver and interrupting a flow of said main power signals to the camera during a first of said modes, for connecting said main power signals to the recorder while enabling a flow of said main power signals to the camera and interrupting a flow of said main power and selection control signals to the receiver during a second of said modes, and for connecting said main power and selection control signals to the recorder while enabling a flow of said main power to the receiver and interrupting a flow of said main power signals to the camera during a third of said modes; and signal selecting means for responding to said selection control signals by enabling the recorder to receive video and audio signals from the camera during said second mode, and enabling the recorder to receive video and audio signals from the receiver during said third mode, said signal selecting means including:

a first set of video and audio terminals coupling the recorder to receive external sources of video and audio signals in response to said selection control signals during said first mode;

a second set of video and audio terminals coupling the recorder to receive video and audio signals from the camera during said second mode; and a third set of video and audio terminals coupling the recorder to receive video and audio signals from the receiver in response to said selection control signals during said third mode.

7. The switching control system of claim 6, wherein said power feeding means comprises a plurality of leads coupled to said control means with a first one of said leads coupled to provide said main power signals to the recorder during said first mode, a second one of said leads coupled to provide said main power signals to the recorder and to the camera during said second mode, and a third one of said leads coupled to provide said main power signals to the recorder and to the receiver during said third mode.

8. The switching control system of claim 6, wherein said control means comprises:

a first set of terminals dedicated to distributing said main power signals to said power feeding means;

a second set of terminals dedicated to applying said selection control signals to said signal selecting means; and terminals of said first and second sets being operable in pairs for simultaneously controlling distribution of main power signals to the recorder and to selected ones of the camera and receiver providing video signals to the recorder.

9. The switching control system of claim 8, wherein said power feeding means comprises a plurality of leads coupled to different terminals of said first set, with a first one of said leads coupled to provide said main power signals to the recorder during said first mode, a second one of said leads coupled to provide said main power signals to the recorder and to the receiver during said second mode, and a third one of said leads coupled to provide said main power signals to the recorder and to the camera during said third mode.

10. The switching control system of claim 8, wherein said power feeding means comprises:

a plurality of leads coupled to nodes of said first set with a first one of said leads coupled to provide said main power signals to the recorder, a second one of said leads coupled to provide said main power signals to the camera, and a third one of said leads coupled to provide said power to the receiver;

first means coupled between said first and second leads, for enabling current flow between said first and second leads during said second mode; and second means coupled between said first and third leads, for enabling current flow between said first and third leads during said third mode.

11. A switching control system, comprising:

control means enabling a plurality of modes of operability for a recorder, a camera and a broadcast signal receiver, for providing main power and selection control signals for said modes, with both said main power and selection control signals being simultaneously provided during a plurality of said modes;

power feeding means controlled by said control means, for connecting said main power to the recorder while interrupting a flow of said main power signals to the receiver and interrupting a flow of said main power signals to the camera during a first of said modes, for connecting said main power signals to the recorder while enabling a flow of said main power signals to the camera and interrupting a flow of said main power signals to the receiver during a second of said modes, and for connecting said power signals to the recorder while enabling a flow of said main power to the receiver and interrupting a flow of said main power signals to the camera during a third of said modes; and signal selecting means for responding to said selection control signals by enabling the recorder to receive video and audio signals from the camera during said second mode, and enabling the recorder to receive video and audio signals from the receiver during said third mode.

12. The switching control system of claim 11, wherein said power feeding means comprises a plurality of leads coupled to said control means with a first one of said leads coupled to provide said main power signals to the recorder during said first mode, a second one of said leads coupled to provide said main power signals to the recorder and to the camera during said second mode, and a third one of said leads coupled to provide said main power signals to the recorder and to the receiver during said third mode.

13. The switching control system of claim 12, wherein said control means comprises:

a first set of terminals dedicated to distributing said main power signals to said power feeding means;

a second set of terminals dedicated to applying said selection control signals to said signal selecting means; and terminals of said first and second sets being operable in paris for simultaneously controlling distribution of main power signals to the recorder and to selected ones of the camera and receiver providing video signals to the recorder.

14. The switching control system of claim 13, wherein said power feeding means comprises a plurality of leads coupled to different terminals of said first set, with a first one of said leads coupled to provide said main power signals to the recorder during said first mode, a second one of said leads coupled to provide said main power signals to the recorder and to the receiver during said second mode, and a third one of said leads coupled to provide said main power signals to the recorder and to the camera during said third mode.

15. The switching control system of claim 13, wherein said power feeding means comprises:
    a plurality of leads coupled to nodes of said first set with a first one of said leads coupled to provide said main power signals to the recorder, a second one of said leads coupled to provide said main power signals to the camera, and a third one of said leads coupled to provide said power to the receiver;
    first means coupled between said first and second leads, for enabling current flow between said first and second leads during said second mode; and
    second means coupled between said first and third leads, for enabling current flow between said first and third leads during said third mode.

16. A video and audio switching control network, comprising:
    means for converting broadcast signals into video and audio signals;
    means for receiving video and audio signals generated by a camera;
    a plurality of first terminals disposed to receive video and audio signals from sources other than said converting means and said receiving means;
    a video cassette recorder;
    means for providing a visual display based upon video signals emanating from said video cassette recorder;
    first conducting means for interrupting flow of energy from a main power terminal;
    second conducting means for enabling said energy to flow from said first conducting means to said video cassette recorder, and for enabling video and audio signals to flow between said first terminals and said video cassette recorder;
    third conducting means for enabling said energy to flow from said first conducting means to said video cassette recorder and to said receiving means, and for enabling video and audio signals to flow between said receiving means and said video cassette recorder; and
    fourth conducting means for enabling said energy to flow from said first conducting means to said video cassette recorder and to said converting means, and for enabling video and audio signals to flow between said converting means and said video cassette recorder.

17. The video and audio switching control network of claim 16, further comprised of controlling means for:
    interrupting a flow of energy from said first conducting means to said converting means and said receiving means while said second conducting means enables said energy to flow from said first conducting means to said video cassette recorder;
    interrupting a flow of energy from said first conducting means to said converting means while said third conducting means enables said energy to flow from said first conducting means to said video cassette recorder and to said receiving means; and
    interrupting a flow of energy from said first conducting means to said receiving means while said fourth conducting means enables said energy to flow from said first conducting means to said video cassette recorder and to said converting means.

* * * * *

UNITED STATES PATENT AND TRADEMARK OFFICE
CERTIFICATE OF CORRECTION

PATENT NO. : 5,142,379

DATED : 25 August 1992

INVENTOR(S) : Se-Young JUNG and Tea-Weon MOON

It is certified that error appears in the above-identified patent and that said Letters Patent is hereby corrected as shown below:

Claim 2, Column 5, Line 50, insert --of-- after "terminal".

Claim 13, Column 8, Line 63, change "paris" to --pairs--.

Signed and Sealed this

Seventh Day of September, 1993

Attest:

Attesting Officer

BRUCE LEHMAN

Commissioner of Patents and Trademarks